United States Patent Office 2,723,910
Patented Nov. 15, 1955

2,723,910

PLANT DEFOLIANTS

Lyle D. Goodhue and Carolyn E. Tissol, Bartlesville, Okla., assignors to Phillips Petroleum Company, a corporation of Delaware No Drawing. Application April 4, 1950,
Serial No. 153,994

22 Claims. (Cl. 71—2.7)

This invention relates to the use of organic sulfides as plant defoliants.

Plant defoliating agents are used to expedite the harvest of cotton, soybeans, tomatoes and other crops. Their purpose is to provide an effect similar to that produced by a light frost, namely dropping of the leaves from the plant. A frost or other shock to the plant foliage causes the plant to react by forming abscission layers of cells across the petiole of the leaves which results in leaf drop. In the case of cotton this is especially valuable whether the crop is mechanically picked or hand picked. For example, defoliating at a certain stage in the life of cotton plants causes uniform opening of bolls and permits substantially complete picking in a single pass. Other advantages such as clean product, decreased insect pests and the like are also realized from timely defoliation of growing cotton. In the case of tomatoes, string beans and the like the harvest is expedited by defoliation since the pickers do not have to search for the crop. In a similar manner other plants may be advantageously defoliated with resultant benefits such as forced ripening of fruit, ease of picking and the like.

We have now discovered that organic sulfides are effective plant defoliants. These compounds may be represented by the general formula $RS_{(x)}R'$ wherein R and R' represent straight or branched-chain alkyl groups, cycloalkyl groups, combinations thereof such as alkyl cycloalkyl, alkaryl and the like, $(x)$ represents an integer from two to five and wherein R and R' each contain at least three and not more than 10 carbon atoms and are not necessarily identical.

Thus according to this invention, there is provided a method for defoliation of a plant which comprises applying to said plant an organic sulfide.

Typical compounds applicable to the present invention when $(x)$ is two include di-tertiary-hexyl disulfide, di-tertiary-octyl disulfide, di-tertiary-decyl disulfide, di-n-hexyl disulfide, di-cyclohexyl disulfide, di-phenylethyl disulfide and the like. When $(x)$ is three or more typical compounds include di-tertiary-butyl trisulfide, di-tertiary-hexyl polysulfide, di-n-butyl polysulfide, di-phenylethyl polysulfide and the like.

These compounds are effective plant defoliants when applied to plants in any suitable form such as solutions, emulsions, dusts, aerosols, fogs and the like. We have found that it is convenient to apply a sulfide of the class disclosed as an erosol or as a dust such as might be applied from aircraft. They can also be applied as solutions in suitable solvents or as aqueous emulsions by spraying.

Any suitable carrier or solvent can be employed which will not act against the active defoliating agent. When applied to cotton, tomatoes, beans or other crops the carrier or solvent must not be harmful thereto. Examples of solvents or carriers include paraffinic hydrocarbons containing at least five carbon atoms such as n-pentane, isopentane, cyclohexane, octane and the like or mixtures thereof, isoparaffinic hydrocarbons and the like. Talc, kieselguhr and other inert carriers may be used in preparing dusts. Water may be used advantageously to form emulsions of said compounds for spraying. When preparing emulsions, wetting or emulsifying agents such as Triton X 100 (alkyl aryl polyether alcohol), Dresinate 731 (sodium salt of a disproportionated rosin acid), Tween 20 (sorbitan monolaurate polyethylene oxide) and the like are employed in sufficient quantity to stabilize the emulsion. Emulsions containing from one to ten per cent by weight of the sulfide are usually preferred.

It is an advantage of our novel defoliants that they are effective when applied to plants in the absence of moisture. It is not necessary to wait for rain or heavy dew and thus application may be made when the plants are in the desired state of growth. It is a further advantage that these compounds are much less toxic to men or animals than many of the defoliants disclosed in the prior art. This is especially important for the safety of spray operators.

The defoliants of the present invention may be applied in any desired concentration. We have found that 10 to 100 pounds of disulfide per acre provides a defoliating action. Usually from about 60 to 100 pounds per acre will provide substantially complete defoliation of cotton, though as low as 2 pounds per acre will cause some defoliation.

The compounds of the present invention may be obtained from any suitable source. One method for the production of compounds wherein $(x)$ is two comprises the oxidation of the corresponding alkyl mercaptans. The alkyl polysulfides, i. e. where $(x)$ is three or more may be prepared by the addition of sulfur to an alkyl disulfide over a suitable catalyst, or by other conventional procedures known to the art, such as the interaction of alkyl mercaptans with sulfur chloride, thionyl chloride, with sulfhydryl compounds and the like.

Example I

An aqueous emulsion containing five per cent by weight of di-tertiary-hexyl disulfide was prepared using about 0.5 weight per cent of Triton X 100 as the emulsifying agent. Said emulsion was then sprayed on mature cotton plants at a rate of 75 pounds of disulfide per acre in a field test. Five to seven days after application substantially all of the leaves showed the formation of abscission layers across the base of the petiole. After two weeks substantially all of the leaves had fallen from the plants.

Example II

A five per cent solution of di-tertiary-octyl-disulfide in Soltrol 140 (an isoparaffinic hydrocarbon boiling between 360 and 410° F. at 760 mm.) was sprayed on mature cotton plants at a rate of 80 pounds of disulfide per acre in a field test. Four to five days after application substantially all of the leaves showed the formation of abscission layers at the base of the petiole. Thirteen to fourteen days after application substantially all of the leaves had fallen from the plants.

Although hydrocarbon solvents, alone, have no apparent effect upon cotton plants, hydrocarbon solutions of the defoliant compounds of this invention are more effective than corresponding aqueous emulsions. It is, therefore, believed that the hydrocarbon solvent actually contributes to the defoliating action of the organic sulfides, an unexpected fact.

Example III

An aqueous emulsion containing five weight per cent of a mixture of polysulfides consisting principally of di-tert.-butyl trisulfide (50 weight per cent sulfur content) was prepared using 0.5 weight per cent of Triton X 100 (alkaryl polyether alcohol) as the emulsifying agent. Ten ml. of this emulsion was sprayed on a young cotton plant in a laboratory test. Two to three days after application the formation of abscission layers at the base of the leaf petioles was observed and defoliation was complete after seven days.

*Example IV*

A laboratory test was made wherein .05 ml. of substantially pure di-tertiary-octyl disulfide was applied to each leaf of three week old string bean plants. Three to four days after application the formation of abscission layers at the base of the leaf petioles was observed. Dropping of the leaves occurred six to eight days after application.

Variation and modification are possible within the scope of the foregoing disclosure and the appended claims to the invention the essence of which is that organic sulfides have been discovered to possess excellent plant defoliation properties with the added advantages that they are effective when applied in the absence of moisture and are considerably less toxic to humans and animals than many of the defoliants now known.

We claim:

1. The method of defoliating a plant which comprises applying to said plant an amount, sufficient to effect defoliation of said plant, of an organic sulfide having the general formula $RS_{(x)}R'$ wherein R and R' each represents one of straight and branched-chain alkyl groups, cycloalkyl groups, alkylcycloalkyl groups and alkaryl groups, $(x)$ represents an integer from two to five and wherein R and R' each contains only hydrogen and carbon, at least three and not more than 10 carbon atoms and are not necessarily identical.

2. The method of claim 1 wherein the plant is a cotton plant.

3. A method according to claim 1 wherein the amount of said organic sulfide applied to said plant is in the range 2 to 100 pounds per acre.

4. A method according to claim 1 wherein the amount of said organic sulfide applied to said plant is in the range 10 to 100 pounds of said sulfide per acre.

5. A method according to claim 1 wherein the amount of said organic sulfide applied to said plant is in the range 60 to 100 pounds per acre.

6. The method of defoliating a plant which comprises applying to said plant di-tertiary-hexyl disulfide in an amount sufficient to effect defoliation of said plant.

7. The method of claim 6 wherein the plant is a cotton plant.

8. The method of defoliating a plant which comprises applying to said plant di-tertiary-octyl disulfide in an amount sufficient to effect defoliation of said plant.

9. The method of claim 8 wherein the plant is a cotton plant.

10. The method of defoliating a plant which comprises applying to said plant di-tertiary-butyl trisulfide in an amount sufficient to effect defoliation of said plant.

11. The method of claim 10 wherein the plant is a cotton plant.

12. The method of defoliating a plant which comprises applying to said plant an amount, sufficient to effect defoliation of said plant, of an aqueous emulsion containing about 5 per cent by weight of di-tertiary-hexyl disulfide.

13. The method for defoliating a plant which comprises applying to said plant an amount, sufficient to effect defoliation of said plant, of an organic sulfide having the general formula $RS_{(x)}R'$ wherein R and R' each represents one of straight and branched-chain alkyl groups, cycloalkyl groups, alkylcycloalkyl groups and alkaryl groups, $(x)$ represents an integer from two to five and wherein R and R' are unsubstituted hydrocarbon groups and each contains at least three and not more than 10 carbon atoms and are not necessarily identical, said sulfide being dissolved in a hydrocarbon solvent in concentration to effect the desired defoliation.

14. A plant defoliation composition consisting essentially of an organic sulfide having the general formula $RS_{(x)}R'$ wherein R and R' each represents one of straight and branched-chain alkyl groups, cycloalkyl groups, alkylcycloalkyl groups and alkaryl groups, $(x)$ represents an integer from two to five and wherein R and R' are unsubstituted hydrocarbon groups and each contains at least three and not more than 10 carbon atoms and are not necessarily identical, admixed with a dust in a proportion effective upon application to said plant to cause its defoliation.

15. A plant defoliation composition consisting essentially of a defoliating amount of di-tertiary hexyl disulfide in a suitable dust.

16. A plant defoliation composition consisting essentially of a defoliating amount of di-tertiary butyl trisulfide in a suitable dust.

17. A plant defoliation composition consisting essentially of an organic sulfide having the general formula $RS_{(x)}R'$ wherein R and R' each represents one of straight and branched-chain alkyl groups, cycloalkyl groups, alkylcycloalkyl groups and alkaryl groups, $(x)$ represents an integer from two to five and wherein R and R' are unsubstituted hydrocarbon groups and each contains at least and not more than 10 carbon atoms and are not necessarily identical, suspended in an aqueous medium, comprising a suspension agent, in a proportion effective upon application to said plant to cause its defoliation.

18. A plant defoliation composition consisting essentially of a defoliating amount of di-tertiary hexyl disulfide in an aqueous medium comprising a suspension agent.

19. A plant defoliation composition consisting essentially of a defoliating amount of di-tertiary butyl trisulfide in an aqueous medium comprising a suspension agent.

20. A plant defoliation composition consisting essentially of a defoliating proportion of an organic sulfide having the general formula $RS_{(x)}R'$ wherein R and R' each represents one of straight and branched-chain alkyl groups, cycloalkyl groups, alkylcycloalkyl groups and alkaryl groups, $(x)$ represents an integer from two to five and wherein R and R' are unsubstituted hydrocarbon groups and each contains at least three and not more than 10 carbon atoms and are not necessarily identical, and an isoparaffinic hydrocarbon solvent.

21. A plant defoliation composition consisting essentially of a defoliating proportion of an organic sulfide having the general formula $RS_{(x)}R'$ wherein R and R' each represents one of straight and branched-chain alkyl groups, cycloalkyl groups, alkylcycloalkyl groups and alkaryl groups, $(x)$ represents an integer from two to five and wherein R and R' are unsubstituted hydrocarbon groups and each contains at least three and not more than 10 carbon atoms and are not necessarily identical, and an isoparaffinic hydrocarbon solvent boiling between 360–410° F. at 760 mm. Hg.

22. A plant defoliation composition consisting essentially of a defoliating concentration of di-tertiary hexyl disulfide in an isoparaffinic hydrocarbon.

References Cited in the file of this patent

UNITED STATES PATENTS

| | | |
|---|---|---|
| 1,986,218 | Remy | Jan. 1, 1935 |
| 2,043,941 | Williams | June 9, 1936 |
| 2,467,713 | Watkins | Apr. 19, 1949 |
| 2,614,914 | Eby | Oct. 21, 1952 |

FOREIGN PATENTS

| | | |
|---|---|---|
| 700,615 | Germany | Dec. 24, 1940 |

OTHER REFERENCES

Journal of Economic Entomology, vol. 33 (1940) pages 876 to 878.

"Science," Oct. 16, 1936, page 356.

Journal American Chem. Soc., March 1947, pages 718 and 721.